United States Patent [19]
Barnette, Jr.

[11] Patent Number: 6,035,709
[45] Date of Patent: Mar. 14, 2000

[54] METHOD OF ENHANCING THE MEASUREMENT ACCURACY OF A TIRE UNIFORMITY MACHINE

[75] Inventor: Audice Wendell Barnette, Jr., Hartville, Ohio

[73] Assignee: The Goodyear Tire & Rubber Company, Akron, Ohio

[21] Appl. No.: 09/180,044

[22] PCT Filed: Jul. 30, 1996

[86] PCT No.: PCT/US96/12484

§ 371 Date: Oct. 29, 1998

§ 102(e) Date: Oct. 29, 1998

[87] PCT Pub. No.: WO98/04897

PCT Pub. Date: Feb. 5, 1998

[51] Int. Cl.[7] ................................................. G01M 17/02
[52] U.S. Cl. ................................................................ 73/146
[58] Field of Search .................... 73/146, 8, 9; 51/165 R, 51/165.77, 281 R, 289 R; 409/166

[56] References Cited

U.S. PATENT DOCUMENTS

| | | |
|---|---|---|
| 3,739,533 | 6/1973 | Iida et al. . |
| 3,946,527 | 3/1976 | Beer . |
| 4,914,869 | 4/1990 | Bayonnet et al. . |
| 5,263,284 | 11/1993 | Wild . |

FOREIGN PATENT DOCUMENTS

| | | |
|---|---|---|
| 0342773 | 11/1989 | European Pat. Off. . |
| 61-231432 | 10/1986 | Japan . |

*Primary Examiner*—William Oen
*Attorney, Agent, or Firm*—Howard M Cohn

[57] ABSTRACT

A method for enhancing the measurement accuracy of a tire uniformity machine by combining signals generated by supplementary load cells with signals generated by corresponding measuring load cells to vibration signals generated by the tire uniformity machine.

15 Claims, 3 Drawing Sheets

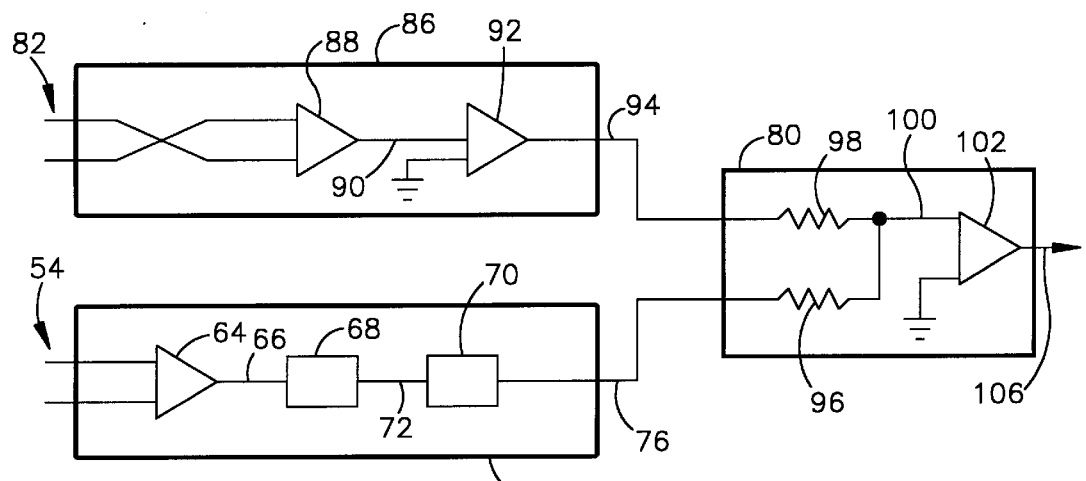
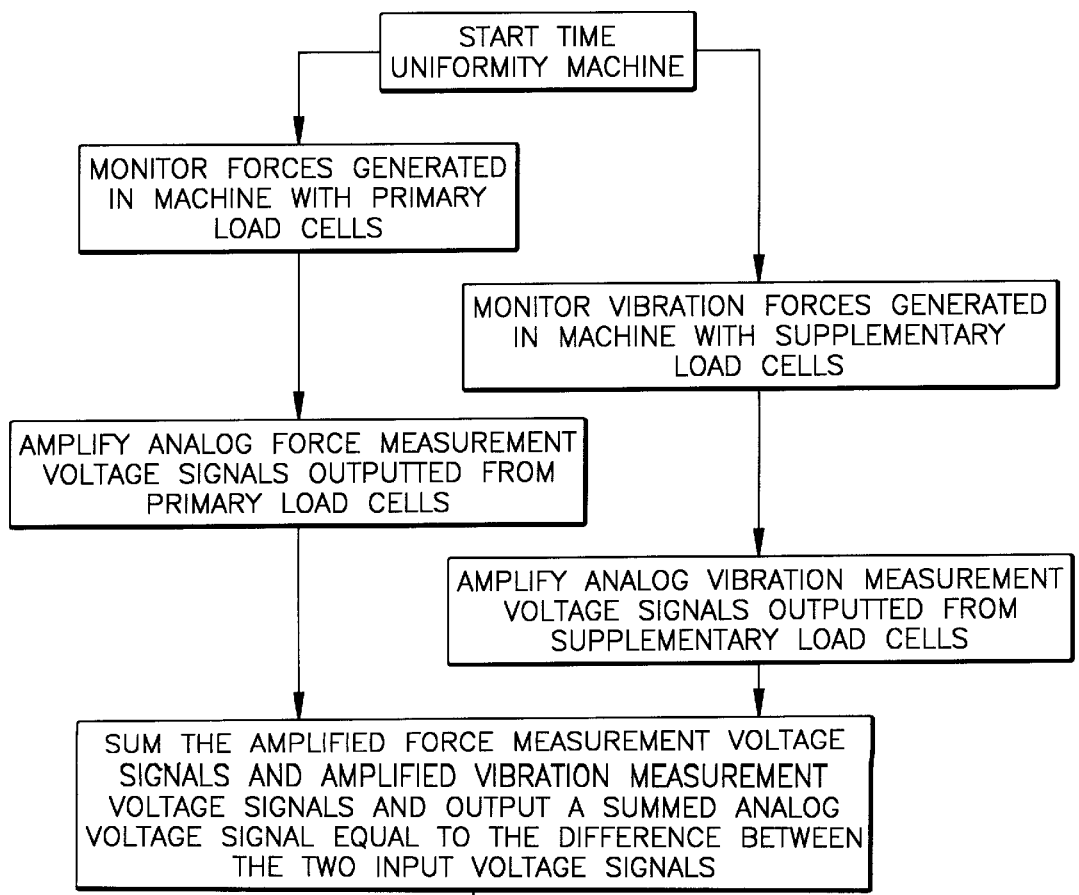
Figure 3
Figure 4A

METHOD OF ENHANCING THE MEASUREMENT ACCURACY OF A TIRE UNIFORMITY MACHINE

FIELD OF THE INVENTION

This invention relates to the field of enhancing the measurement accuracy of a machine, and more particularly to a method of enhancing the measurement accuracy of a tire uniformity machine by combining differential signals generated by supplementary load cells with signals generated by measuring load cells to cancel signals generated by the vibration of the tire uniformity machine.

BACKGROUND OF THE INVENTION

In the art of manufacturing pneumatic tires, rubber flow in the tire mold or minor differences in the dimensions of the belts, beads, liners, treads, plies of rubberized cords, etc., sometimes cause non-uniformities in the final tire. Non-uniformities of a sufficient amplitude will cause force variations on a surface, such as a road, against which the tires roll which produce vibrational and acoustical disturbances in the vehicle upon which the tires are mounted. Regardless of the cause of the force variations, when such variations exceed an acceptable maximum level, the ride of a vehicle utilizing such tires will be adversely affected.

Methods have been developed in the past to correct for excessive force variations by removing rubber from the shoulders and/or the central region of the tire tread by means such as grinding. These correction methods are commonly performed with a tire uniformity machine, which includes an assembly for rotating a test tire against the surface of a freely rotating load wheel. In this testing arrangement, the load wheel is moved in a manner dependent on the forces exerted by the rotating tire and those forces are measured by appropriately placed measuring devices, e.g., load cells. When a tire being tested yields less than acceptable results, shoulder and center rib grinders are used to remove a small amount of the tire tread at precisely the location of non-uniformities detected by the measuring devices. As the tire is rotated, it is measured and ground simultaneously. In a sophisticated tire uniformity machine (TUM), such as a Model No. D70LTW available from the Akron Standard Co. of Akron Ohio, the force measurements are interpreted by a computer and rubber is removed from the tire tread using grinders controlled by the computer. Examples of tire uniformity machines utilizing these methods are disclosed in U.S. Pat. Nos. 3,739,533, 3,946,527, 4,914,869, and 5,263,284.

Any vibration that is generated by the tire uniformity machine is detected by its force variation measuring elements, i.e., the load cells. Small quantities of vibration caused by extraneous sources are acceptable because electronic filters are used to remove this extraneous noise. But when the motor bearings wear out, or the grind wheels are defective or improperly installed, or noise and vibration from machines external to the tire uniformity machine are present, excessive vibration will occur. Detection of this excessive vibration by the force measuring elements, i.e., the load cells, can cause inaccurate measurement of the force variations of the tires being measured on the tire uniformity machine. This in turn can result in the tire tread being ground at the wrong locations to eliminate excessive force variations of the tires, resulting in longer grind times, fewer tires processed, and more scrap tires.

Currently, the prior art method of detecting excessive vibration is to use an external vibration analyzer with a movable accelerometer, which a technician manually locates on different points of the tire uniformity machine. Problems with this technique are that the equipment is costly, it takes several hours to complete the vibration analysis, and the resulting downtime of the tire uniformity machine is expensive. Also, since defects in the machine are usually discovered on an infrequent basis, problems are often not discovered before more costly damage results.

As discussed above, efforts have been, and are continuously being made to more improve the accuracy with which tire non-uniformity is corrected. Nothing in the prior art, however, suggests constantly detecting and correcting for extraneous vibration in the tire uniformity machine both prior to and while the force variations in the tire being corrected is measured and reduced through tire grinding.

SUMMARY OF THE INVENTION

In accordance with the invention, there is provided an apparatus for enhancing the measurement accuracy of a tire uniformity machine. The apparatus includes primary load cells supporting a load wheel spindle with a freely rotating load wheel mounted on the spindle. Supplementary load cells are each mounted to the tire uniformity machine in close proximity to a corresponding primary load cells. Each of the supplementary load cells has a fixed mass attached thereto. An electric signal conditioner includes a plurality of signal conversion sections which convert force measurement voltage signals generated by the primary load cells into force measurement signals that can be inputted into a computer. A plurality of differential input sections convert differential voltage signals from the supplementary load cells into differential signals that can be inputted into the computer. A signal summing section is provided to sum the force measurement signals and the differential signals and to output the difference between the measurement signals and the differential signals to the computer.

Also in accordance with the invention, a method of enhancing the measurement accuracy of a tire uniformity machine comprising the following steps. The forces generated by the vibration of the tire uniformity machine are monitored with primary load cells supporting a wheel spindle of the tire uniformity machine with a freely rotating load wheel mounted thereon and force measurement voltage signals are generated in response thereto. The forces generated by the vibration of the tire uniformity machine are monitored with supplementary load cells mounted to the tire uniformity machine and differential voltage signals are generated in response thereto. The force measurement voltage signals generated by the primary load cells are converted into analog voltage measurement signals. The differential output voltage signals are reversed and converted into analog differential signals. The analog voltage measurement signals and the analog differential voltage signals are summed and summed analog voltage signals equal to their difference are outputted to the computer to substantially cancel the effect of vibrational forces generated by the tire uniformity machine.

It is an object of the present invention to provide a method for measuring the quantity of extraneous vibration in a tire uniformity machine.

A further object is to obviate the problems and limitations of the prior art methods. Other objects of this invention will be apparent from the following description and claims.

BRIEF DESCRIPTION OF THE DRAWINGS

The structure, operation, and advantages of the presently preferred embodiment of the invention will become further apparent upon consideration of the following description taken in conjunction with the accompanying drawings, wherein:

FIG. 3 is a schematic illustration of the electrical circuitry interconnecting one of the primary load cells to a corresponding supplementary load cell; and FIGS. 4A and 4B, collectively FIG. 4, is flow diagram of the process of the present invention.

DETAILED DESCRIPTION OF THE INVENTION

Figure 1:
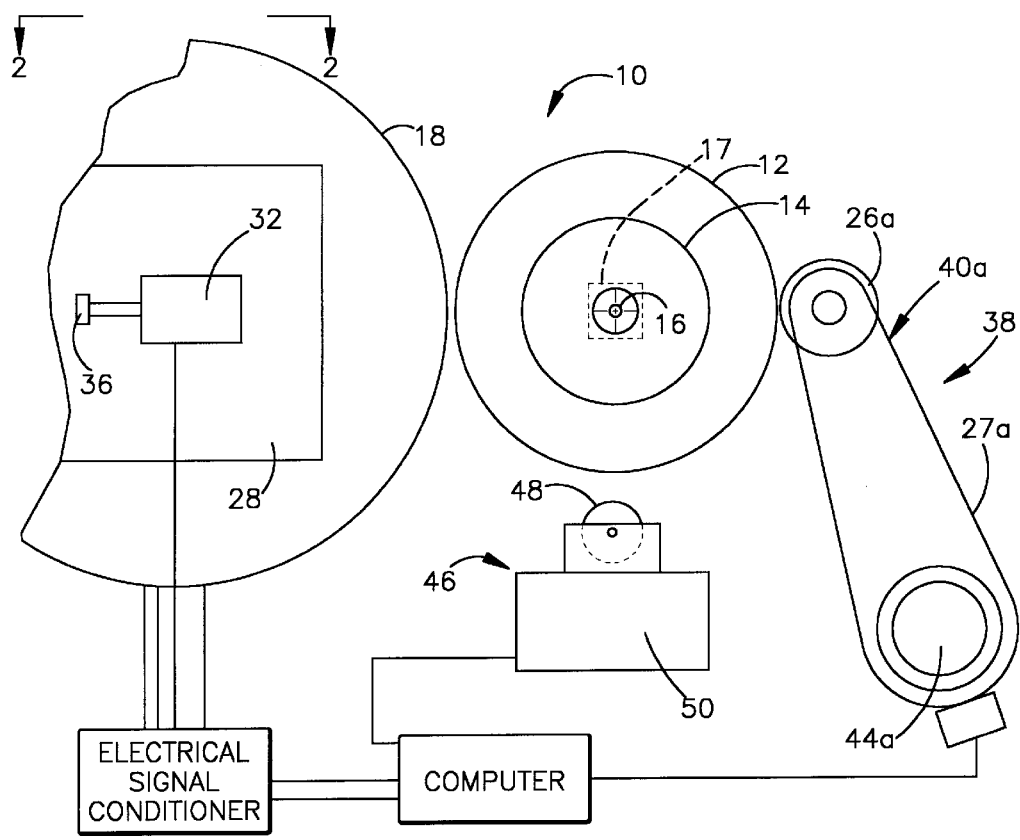
FIG. 1 is a schematic illustration of a plan view of a tire uniformity machine in accordance with the invention with a tire mounted thereon.
Figure 2:
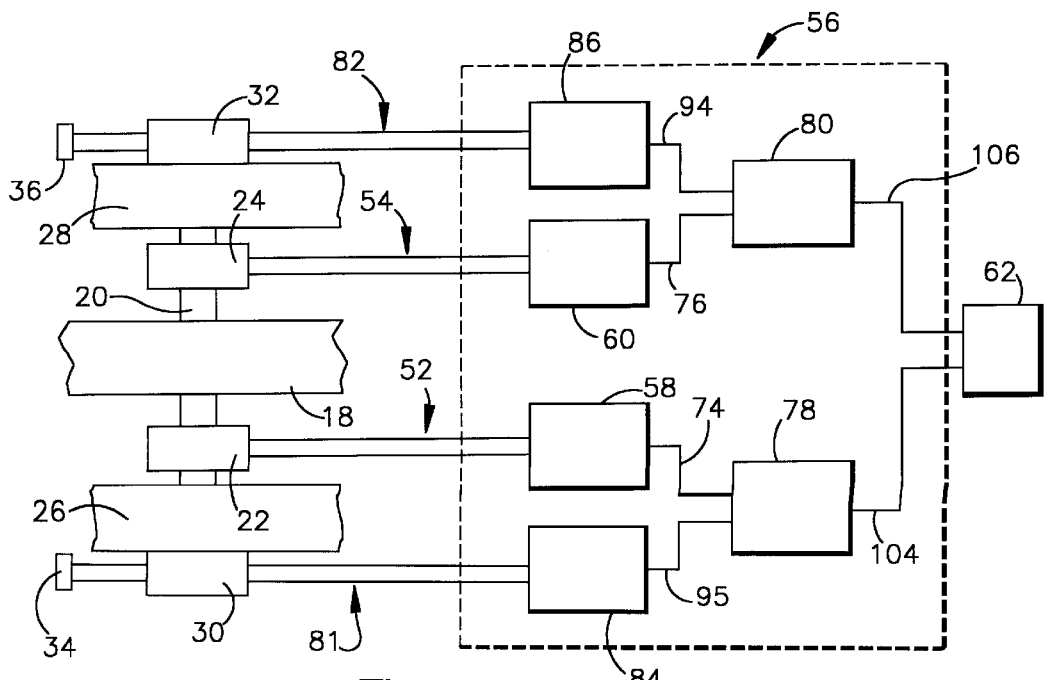
FIG. 2 is a schematic illustration of a side view through line 2—2 of FIG. 1, showing a load wheel mounted between two primary load cells which generate output signals in response to the force variations of a tire, two supplementary load cells mounted to the frame of the tire uniformity machine, and electrical circuitry for detecting and canceling extraneous vibrations picked up by the tire uniformity machine.

Referring to FIGS. 1 and 2, there is illustrated a tire uniformity machine (TUM) 10 in accordance with the invention adapted for mounting a tire 12. Tire 12 is typically a pneumatic tire having a circumferential tire tread with top and bottom shoulder regions and a central region between the top and bottom shoulder regions. The tire 12 can be mounted on a rim 14 secured to a tire spindle 16 and inflated to a desired pressure. A variable speed motor 17, shown with phantom lines, rotates the tire spindle 16 and rim 14. The tire 12 can be placed under load by a load wheel 18, which is rotatably supported on a fixed spindle 20 extending through the load wheel and suspended from primary load cells 22,24 at either end. The primary load cells 22,24, in turn, are mounted to the frame supports 26,28, respectively, of the tire uniformity machine. Each of the primary load cells 22,24 includes a lateral load cell section conventionally used to measure the lateral force exerted by the tire 12 against load wheel 18 in a direction parallel to the axis of rotation extending about which the load wheel rotates. The primary load cells 22,24 also include a radial load cell section conventionally used to measure the radial force at the point of intersection of the tire 12 and the load wheel 18 exerted by the tire 12 against the load wheel 18 and through spindle 20 about which the load wheel rotates.

An important aspect of the present invention relates to the provision of supplementary load cells 30,32 mounted in close proximity to the primary load cells 22,24, such as on the frame supports 26,28, respectively, as shown. Each supplementary load cell 30,32 has a fixed mass, such as weight 34,36, respectively, attached thereto to simulate the fixed mass attached to each of the primary load cells 22,24, respectively. While the supplementary load cells 30,32 are shown mounted to frame supports 26,28 in one location, it is also within the terms of the invention to mount them at other locations on the TUM 10, as long as they are in close proximity to and oriented in the same direction as primary load cells 22,24.

During the testing of a tire 12 for non-uniformities, the load wheel 18 is pressed against the tire to load the inflated tire with a specified force (for example, 600 to 1900 lb) to simulate road conditions. The spindle 20 is mounted to bearing blocks (not shown) and is moved by conventional means, such as an electric motor (not shown) operating through a ball-and-screw connection, to move the load wheel 18 into and out of engagement with the tire 12.

A shoulder grinding assembly 38 is located substantially 180° with respect to tire 12 from load wheel 18. The shoulder grinding assembly 38 includes substantially identical top and bottom shoulder grinders 40a and 40b (only top shoulder grinder 40a is illustrated and described), which include grinding wheels that are powered by motors and are independently moved into and out of engagement with the shoulder regions of tire 12. As shown, the top shoulder grinder 40a has a grinding wheel 42a powered by a motor 44a and can be moved into and out of engagement with the shoulder portions of tire 12 by any conventional means, such as an hydraulic servo device (not shown). A center grinder assembly 46 is located adjacent wheel 12 approximately 90° counter-clockwise about tire 12 from load wheel 18. The center grinder assembly 46 has a grinding wheel 48 that is powered by a motor 50 and is moved into and out of engagement with the central region of the tread of tire 12 by conventional means, such as with an hydraulic servo device (not shown).

Voltage signals, proportional to the amplitude of the radial and/or lateral forces, are generated by primary load cells 22,24 and inputted through lines 52 and 54, respectively, into an electric signal conditioner 56. The electric signal conditioner 56 includes substantially identical signal conversion sections 58 and 60 which convert the force measurement voltage signals generated by primary load cells 22,24, respectively, into signals that are conditioned so that they can be inputted to and stored in a computer 62. The signal conversion sections 58 and 60, as shown in FIG. 3, each includes at least one amplifier 64 connected by lines 52,54 to primary load cells 22, 24, respectively. The amplified output signal from the amplifier 64 is directed through line 66 into an anti-aliasing filter 68 to cut off the high frequency outputs, i.e. greater than approximately 45 Hertz, from primary load cells 22,24 so that the high frequency content contained in the amplified load cell signal does not cause aliasing in the analog to digital conversion. The electric signal conditioner 60 also includes a low pass filter 70 connected in series to anti-aliasing filter 68 through line 72. The low pass filter 70 attenuates frequencies greater than 16 hertz, from the amplified output signal of amplifier 64 so that the signal bandwidth is limited to frequencies generated by the tire and load wheel. The output signal from low pass filter 62 is directed through lines 74,76 into a signal summing sections 78,80, respectively, as discussed below.

The present invention is directed to the measurement and elimination of deviations from the prescribed specifications of the TUM 10, i.e., operating under conditions without extraneous vibrations, caused primarily by extraneous vibrations generated by or induced in machine 10. The extraneous vibrations are caused by rotating components such as a motor-driven tire spindle 16, the tire grinding assemblies 38, and the center grinding assembly 46, the motor bearings wearing out, the grind wheels being defective or improperly installed, and/or noise and vibration from machines external to the tire uniformity machine 10. The primary sensors for many of the required measurements used in operating the TUM 10 are primary load cells 22,24 which are normally in the electrical differential mode. This fact, combined with the inherent low impedance of primary load cells 22,24, usually provides an adequate quality signal output for the TUM 10. The primary load cells 22,24, however, cannot discriminate between the signal components generated by the force measurement of the tire and a vibration or force component generated by an extraneous vibration generated or picked up by the TUM 10.

To overcome the problem of the readings of the primary load cells 22,24, being corrupted by extraneous vibrations, supplementary load cells 30,32, with substantially identical characteristics to the primary load cells 22,24 are mounted to the TUM 10 so as to be oriented in the same direction and in very close proximity to the primary measuring load cells 22,24, respectively. The supplementary load cells 30,32 have a fixed mass, such as weight 34, 36, respectively, attached thereto. The output voltage signals from the supplementary load cells 30, 32 are directed through pairs of electrical lines 80 and 81 into substantially identical differential input sections 84,86, respectfully. Since differential input sections 84,86 are substantially identical, only differential input sections 86 is shown and described. Referring to FIG. 3, the pair of electrical lines 82 are reversed in differential input section 86 and are inputted into a gain adjustment amplifier 88. The differential voltage signal being output from gain adjustment amplifier 88 is then directed into a line 90 and into a phase adjustment amplifier 92. The voltage output signal from phase adjustment amplifier 92 is then outputted through line 94 into signal summing section 78. The voltage signals through electrical lines 76 and 94 are directed through resistors 96 and 98, respectively, and then combined into line 100 and inputted into a summing amplifier 102. The summing amplifier 102 subtracts the voltage signals from lines 94 and 76 and the resulting amplified signal from summing amplifier 102 is then outputted from signal summing section 80 through line 106 into computer 62. At the same time, the resulting amplified signal outputted from signal summing section 78 through line 106 is directed into computer 62.

Each supplementary load cell 30,32 and corresponding primary measuring load cell 22,24 measure virtually the same noise and vibration components when the TUM 10 is running with no load on the load wheel 18. Since both the primary load cells 22,24 and their corresponding supplementary load cells 30,32 are operating in the differential mode, the pair of signal wires 81,82 from the supplementary load cells can be reversed, as shown in FIG. 3, without any adverse electrical effects. Using this configuration, a positive vibration in the TUM 10 will generate both a positive signal output from the primary measuring load cells 22,24 and a negative signal output from the supplementary load cells 30,32. Assuming that the corresponding primary and supplementary load cells 22 and 30, 24 and 32 and the masses attached to each of them are identical, the two output voltage signals being outputted through lines 74 and 76 from signal conversion sections 58,60 and the two differential output voltage signals being outputted through lines 95,94 from differential input sections 84,86 will theoretically cancel each other in the signal summing sections 78,80. However, a very small residual error might still be present because of the phase shift induced by the slightly different locations of the corresponding primary and supplementary load cells. The gain of amplifier 88 can be adjusted to account for the difference between the mass 34,36 of supplementary load cells 30,32 and the mass associated with each of the primary load cells 22 and 24. The amplifier 92 provides a phase angle adjustment which can be adjusted to correct for the difference in location of the supplementary load cells 30,32 with respect to the corresponding primary load cells 22 and 24. That is, the machine 10 can be calibrated with the rotating portions, such as the motors and grinders turned off. First, an external vibration is induced in machine 10 by a conventional vibration generating device, such as a Model No. 2706 power amplifier and Model No. 4809 shaker from Beuel & Kjaer of Denmark. The gain and phase of the voltage output signals from the supplementary load cells are adjusted with amplifiers 88 and 92 in sections 84 and 86 so that there is a minimum difference between the output voltage signals being outputted by the summing sections 78 and 80 as calculated by computer 62. This calibration effectively cancels the vibration signals induced in the TUM 10 that are picked up by both the primary and supplementary load cells.

Figure 4B:
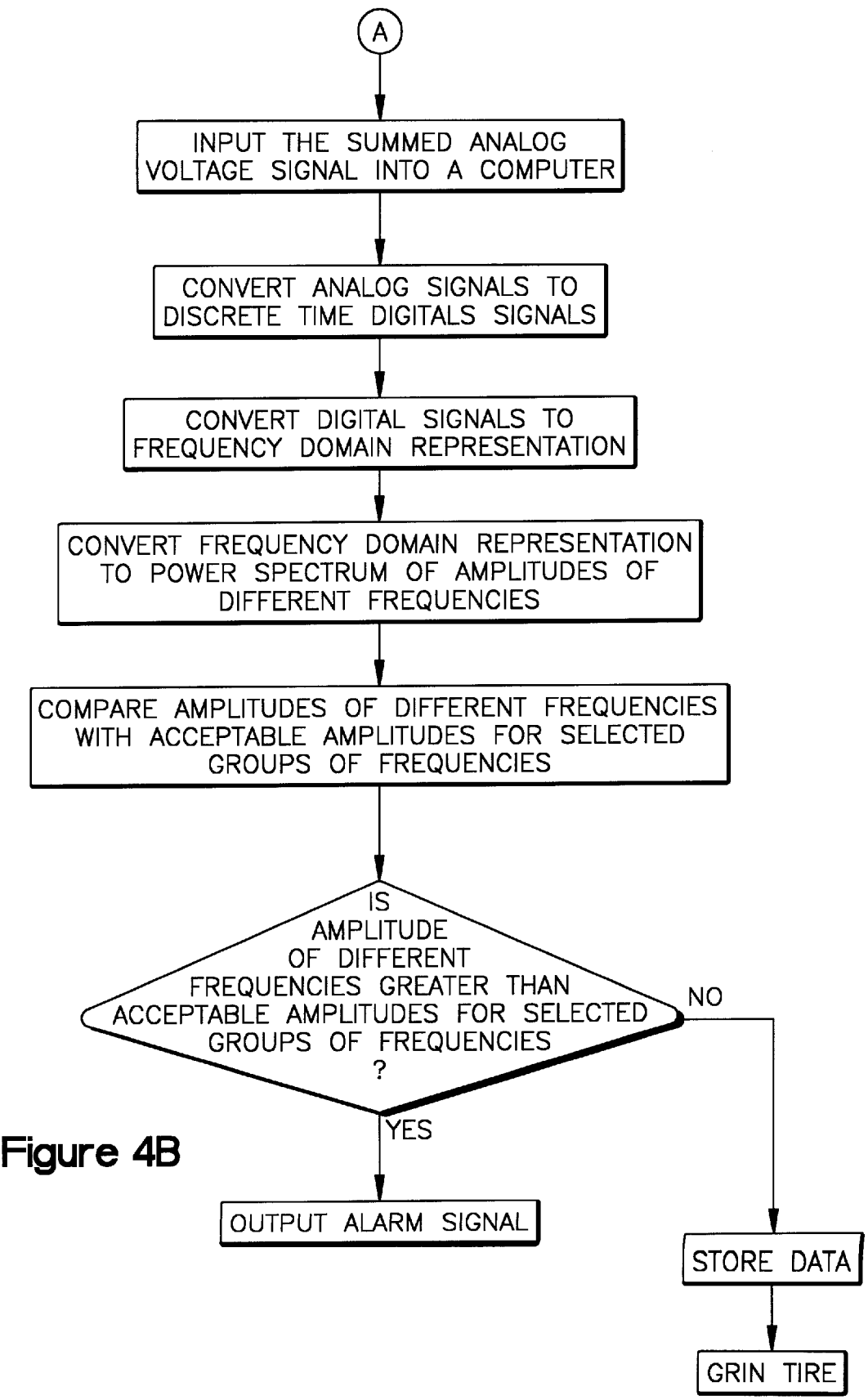

Referring to FIG. 4, there is illustrated a flow diagram of the present invention. When a TUM 10, which incorporates the electric signal conditioner 56 of the present invention is running without force applied by the load wheel 18, the voltage signals inputted through lines 104 and 106 into the computer 62 will be close to zero. As a load is applied by load wheel 18 against tire 12, the measuring load cells 22,24 will respond to the additional load plus the vibration components produced by the rotating components and any extraneous vibrations. The supplementary load cells 30,32 will see only the vibration components produced by the rotating components and any extraneous vibrations. When the voltage signals from the corresponding primary and supplementary load cells 22,30 and 24,32 are subtracted in summing sections 78,80, the vibrational components measured by the primary load cells will be canceled out. The remaining signal components, generated by the primary load cells 22,24 will, for the most part, result from the load forces of the tire against the load wheel 18. That is, the two analog signals being outputted from signal summing sections 78,80 correspond to the monitored radial and/or lateral forces with very low background noise generated by the tire 12 loaded against the load wheel 18 during a predetermined period of time.

The computer 62 independently samples the analog signals being inputted from the summing sections 78,80 for a predetermined time and converts the analog signals to digital signals. Next, computer 62 converts the digital signals to a frequency domain signal representation using a Conventional Fast Fourier Transform (FFT) program for each of the primary load cell signals less the supplementary load cells being monitored. By calculating a FFT for each primary load cell signal independently, the phase shift for each primary load cell can be calculated and a correction table generated for each frequency present in the spectrum. Also, by storing the results of the FFT's for each primary load cell 22,24, signals can be acquired periodically while running without a load on the tire and new FFT's can be calculated and compared with the original FFT's. Comparing the frequency spectrum and the amplitudes of each rotating component of TUM 10 would enable an operator to discover the malfunction of some part of the rotating components. The malfunction could generate an alarm signal.

The computer 62 than operates on the frequency domain signal representation to calculate a power spectrum, as discussed in the previously discussed U.S. Patent Application entitled Method of Machine Vibration Analysis For The Tire Uniformity Machine, of discrete frequency components in hertz versus the amplitude or magnitude of the discrete frequency components in pounds. Selected frequency components are then compared with selected groupings of frequencies representing critical frequencies of different moving parts of the tire uniformity machine 10. An acceptable amplitude for the selected groups of frequencies, representing critical frequencies of the moving parts operating as designed, is inputted into the computer. If the amplitude of the different groups of frequencies generated from the voltage signals outputted by the summing sections 78 and 80 is greater than the acceptable amplitudes for selected groups of frequencies corresponding to the various moving parts of the tire uniformity machine, an alarm signal is output by the computer. The alarm signal indicates that a rotating portion of the tire uniformity machine 10 is defective. The alarm signal could be inputted into a display monitor and/or used to activate an alarm device such as a light or audible alarm, i.e., a bell or buzzer, to alert a machine operator that the tire uniformity machine 10 is vibrating at a level beyond an acceptable limit. The moving component of the tire uniformity machine 10 or external vibration source which is causing the unwanted vibration, can be isolated as generally described in the application entitled Method of Machine Vibration Analysis For The Tire Uniformity Machine.

Computer 62 is conventionally programmed to determine the conicity, lateral force values, radial run-out, and radial force values of the tire 12, and to control the corrective grinding action to take, as discussed in U.S. patent application Ser. No. 08/534,809, entitled METHOD OF CORRECTING CONICITY, RADIAL RUN OUT, AND FORCE VARIATIONS IN A PNEUMATIC TIRE, assigned to The Goodyear Tire & Rubber Co., the assignee of the present invention, is connected to the shoulder grinding assembly 24 and to the center grinder assembly 26 to position these grinding assemblies, as required.

It is also within the terms of the present invention to scale the supplementary load cell capacity and the mass of the reference weight attached to the supplementary load cells, and thereby reduce the mass and physical size of the referenced weights 34 and 36 for easier installation.

While the invention is described in connection with a tire uniformity machine, it is within the scope of the invention to eliminate the extraneous vibrations induced in other types of machines incorporating load cells.

It is apparent that there has been provided in accordance with this invention apparatus and methods for enhancing the measurement accuracy of a tire uniformity machine by subtracting differential signals generated by supplementary load cells with signals generated by primary measuring load cells to cancel the portion of the signals of the primary measuring load cells which corresponds to the vibration of the tire uniformity machine so as to satisfy the objects, means and advantages set forth hereinbefore.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the scope of the appended claims.

I claim:

1. An apparatus for enhancing the measurement accuracy of a tire uniformity machine, comprising:
    a plurality of primary load cells supporting a load wheel spindle with a freely rotating load wheel mounted on said spindle;
    a plurality of supplementary load cells each mounted to said tire uniformity machine in close proximity to a corresponding one of said plurality of primary load cells, each of said plurality of supplementary load cells having a fixed mass attached thereto;
    an electric signal conditioner including:
        a plurality of signal conversion sections which convert force measurement voltage signals generated by said plurality of primary load cells into force measurement signals that can be inputted into a computer;
        a plurality of differential input sections to convert differential voltage signals from said plurality of supplementary load cells into differential signals that can be inputted into said computer; and
        a signal summing section to sum said force measurement signals and said differential signals and to output the difference between said measurement signals and said differential signals to said computer.

2. The apparatus of claim 1 wherein said plurality of differential input sections are each connected to one of said plurality of supplementary load cells through a pair of lines that are reversed and connected to a amplifier, said plurality of differential input sections each having a phase adjustment amplifier and a gain adjustment amplifier connected in series to each other.

3. The apparatus of claim 2 wherein said plurality of signal conversion sections each includes at least one amplifier connected by lines to one of said plurality of primary load cells.

4. The apparatus of claim 3 wherein said plurality of signal conversion sections each includes an anti-aliasing filter connected in series to the output of said at least one amplifier.

5. The apparatus of claim 4 wherein said plurality of signal conversion sections each includes a low pass filter connected in series with said anti-aliasing filter.

6. The apparatus of claim 4 wherein said fixed mass attached to each of said supplementary load cells is a weight which corresponds to the fixed mass attached to said corresponding one of said plurality of primary load cells.

7. The apparatus of claim 1 wherein said tire uniformity machine has a plurality of rotating components including said freely rotating load wheel, a motor driven spindle, and a plurality of motor driven rotating grinders.

8. The method of enhancing the measurement accuracy of a tire uniformity machine, comprising the steps of:
    monitoring forces generated by the vibration of said tire uniformity machine with primary load cells supporting a wheel spindle of said tire uniformity machine with a freely rotating load wheel mounted thereon and generating force measurement voltage signals in response thereto;
    monitoring forces generated by the vibration of said tire uniformity machine with a plurality of supplementary load cells mounted to said tire uniformity machine and generating differential voltage signals in response thereto;
    converting said force measurement voltage signals generated by said plurality of primary load cells into analog voltage measurement signals;
    reversing and converting said differential output voltage signals into analog differential signals;
    summing said analog voltage measurement signals and said analog differential voltage signals and outputting summed analog voltage signals equal to their difference to said computer to substantially cancel the effect of vibrational forces generated by said tire uniformity machine.

9. The method of claim 8 including the step of mounting said supplementary load cells in close proximity to a corresponding one of said plurality of primary load cells.

10. The method of claim 9 including the step of attaching a fixed mass to each of said plurality of supplementary load cells to simulate a fixed mass attached to said corresponding one of said plurality of primary load cells.

11. The method of claim 9 wherein said step of converting said force measurement voltage signals generated by said plurality of primary load cells into analog voltage measurement signals includes the step of amplifying said analog voltage measurement signals.

12. The method of claim 11 wherein said step of reversing and converting said differential output voltage signals includes the step of amplifying said analog differential voltage signals.

13. The method of claim 12 further including the steps of:
converting said summed analog voltage signals to digital signals;
converting said digital signals to a frequency domain representation;
converting said frequency domain representation to a power spectrum representing the amplitudes of different frequencies; and comparing said amplitudes of different frequencies with acceptable amplitudes for selected groups of frequencies.

14. The method of claim 13 including the step of converting said digital signals to a frequency domain representation by mathematically operating on said digital signals with a Fast Fourier Transform equation.

15. The method of claim 14 including the step of outputting an alarm signal from said computer when at least one of said amplitudes of different frequencies is greater than at least one of said acceptable amplitudes for selected groups of frequencies.

* * * * *